United States Patent [19]

Crow

[11] Patent Number: 4,603,973

[45] Date of Patent: Aug. 5, 1986

[54] VISIBILITY ENHANCEMENT SYSTEM

[76] Inventor: Robert P. Crow, 15464 Hamner Dr., Los Angeles, Calif. 90077

[21] Appl. No.: 574,063

[22] Filed: Jan. 26, 1984

[51] Int. Cl.⁴ .......................... G01C 3/08; H04N 7/00
[52] U.S. Cl. ........................................................ 356/5
[58] Field of Search .............. 356/5; 358/95; 455/604; 350/336, 392

[56] References Cited

U.S. PATENT DOCUMENTS

| | | | |
|---|---|---|---|
| 1,939,532 | 12/1933 | Zworykin | 350/392 |
| 2,960,914 | 11/1960 | Rogers | 350/392 |
| 3,228,290 | 1/1966 | Davisson et al. | 350/392 |
| 3,245,315 | 4/1966 | Marks et al. | 350/392 |
| 3,446,555 | 5/1969 | Kahn | 356/5 |
| 3,682,553 | 8/1972 | Kapany | 356/5 |
| 3,689,156 | 9/1972 | Kerpchar | 356/5 |
| 3,743,418 | 7/1973 | Heflinger | 356/5 |
| 4,071,912 | 2/1978 | Budmiger | 350/392 |
| 4,129,780 | 12/1978 | Laughlin | 356/5 |
| 4,134,008 | 1/1979 | Corlieu et al. | 455/604 |
| 4,386,836 | 6/1983 | Aoki et al. | 350/346 |

Primary Examiner—S. C. Buczinski
Attorney, Agent, or Firm—Keith D. Beecher

[57] ABSTRACT

A system for viewing a lighted scene through a diffusive medium, such as rain, fog, snow, blowing dust, or sand, by overcoming the effects of light backscatter. The system uses a flash lamp which operates in response to short electric pulses at a high repetition rate to give the appearance of continuous illumination. The scene is viewed through a panel which operates as a high-speed optical shutter. The panel serves to block the reflected light (backscatter) from the nearby particles of the diffusive medium and passes the reflected light from the distant objects which make up the scene.

17 Claims, 7 Drawing Figures

ELECTRODE ARRANGEMENT ON FACE OF VIEWING PANEL -18-

END CROSS-SECTION OF VIEWING PANEL -18-

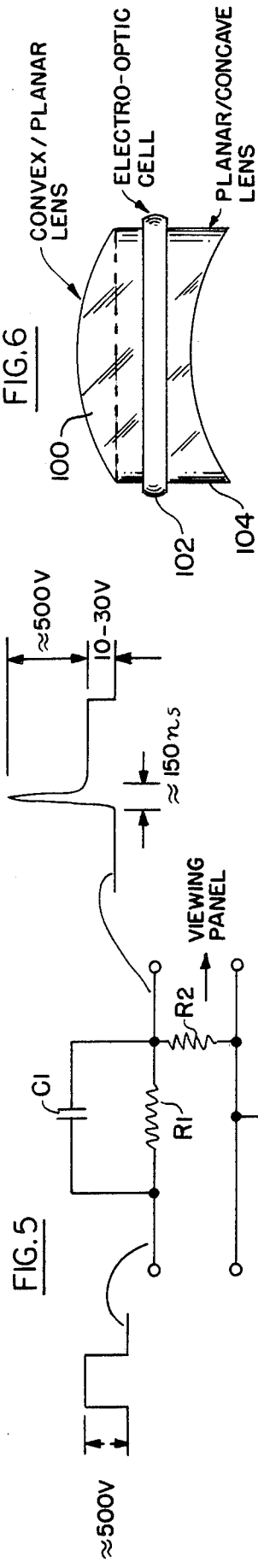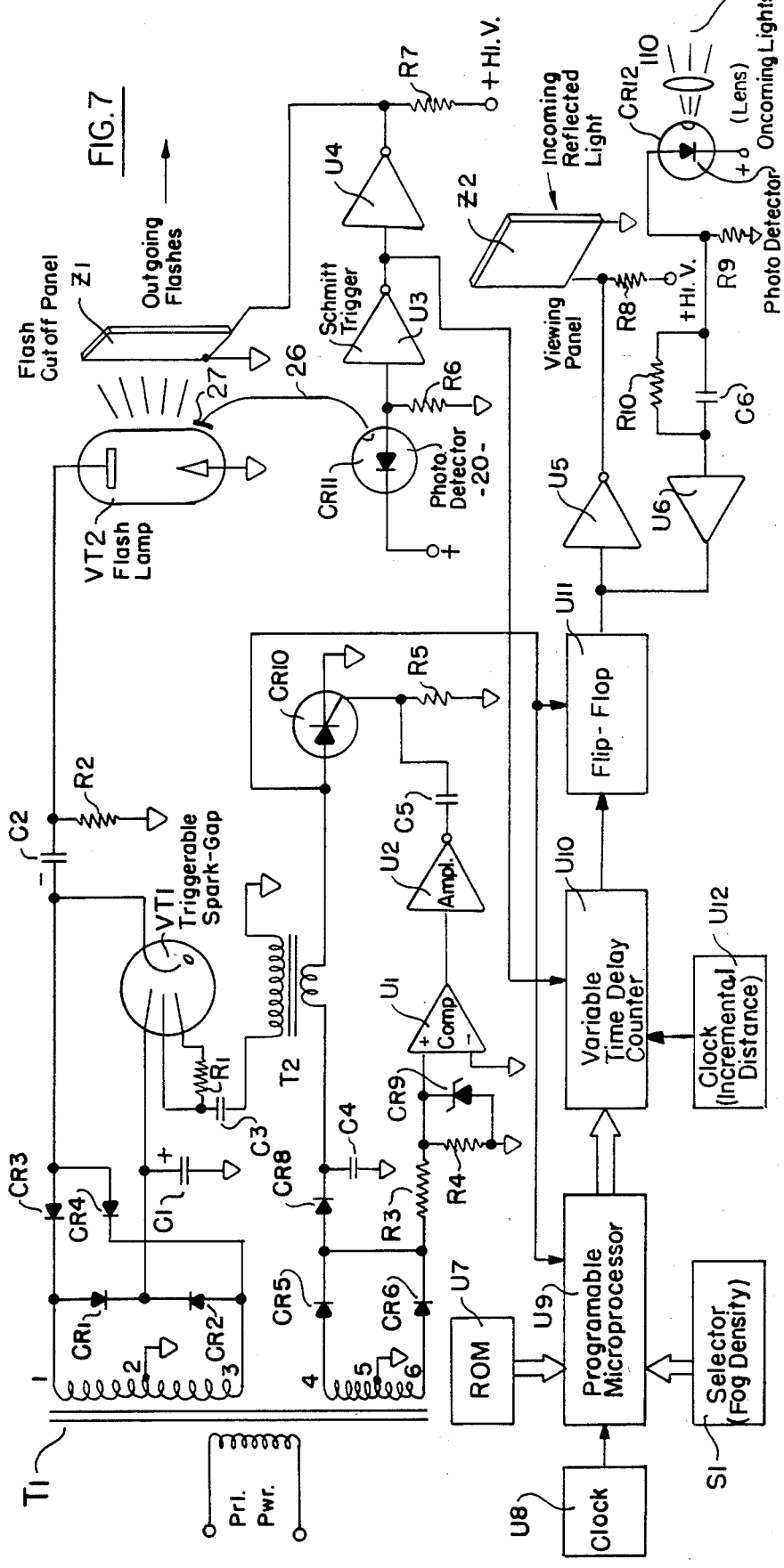

VISIBILITY ENHANCEMENT SYSTEM

BACKGROUND OF THE INVENTION

During adverse weather conditions visibility can be restricted by fog, rain, snow, or blowing dust. At night, the visibility restrictions may be severe even though intense lights are used. The principal reason for night time visibility restrictions is the backscattering of the light from the minute water, snow or dust particles at relatively short ranges. The result is a bright visual "curtain" which obscures the weaker reflected light from more distant objects. The objective of the present invention is to reduce the effects of this phenomenon, and to provide improvements in visual range through such diffusive media. Forwardscatter also occurs in the diffusive media, reducing the observed resolution of an object, but its effects are of much lesser magnitude. The effects of forwardscatter are not dealt with by the present invention.

U.S. Pat. No. 4,174,524 discloses a system for overcoming the effects of backscatter and forwardscatter in viewing an object through a diffusive medium. The apparatus described in the patent includes a projector for projecting successive picosecond coherent light pulses through the medium to the object to be viewed, and it also includes a light receiving element for receiving light transmitted through the medium. An optical shutter is positioned in relation to the receiving element for selectively admitting light to the receiving element. An optical path between the source and the shutter couples light of a projected pulse to open the shutter for a picosecond at a selected interval after the pulse has been projected in order to admit light of the pulse reflected from the object to the receiving means. Appropriate structure cooperates with the receiving element to provide sets of light reflective surfaces of the object which are included in one of the one or more discrete viewing spaces, and a display is provided for combining all of the represented images to provide an image of the object. The system described in U.S. Pat. No. 4,174,524 is sophisticated and expensive. In the system of the patent, the scene is not directly viewed, rather, the scene is scanned by the light pulses, and it is slowly reconstructed on the screen of a cathode-ray tube.

Unlike the system described in the patent, the system of the present invention is relatively simple and inexpensive, in that it provides for the direct viewing of the scene without scanning, and the system of the invention uses light pulses which are long as compared with the picosecond light pulses used in the system described in the patent.

U.S. Pat. No. 3,689,156 also describes a system for reducing the effects of backscatter. The system described in the latter patent provides for direct viewing through special goggles which include an electro-optic shutter, and it utilizes a continuous light source that is rapidly shuttered with an electro-optic shutter similar to the shutter used in the viewing goggles. Pochels cells are used in the shutters. These cells are limited to relatively small apertures, and they are expensive. In addition, and most important, the Pochels cells have very limited angles over which acceptable attenuation can be achieved in the opaque mode. Also, the shuttering rate of the light source in the system descrbed in the latter patent must be increased to extremely high values to approach a maximum of 50% obtainable efficiency.

The two patents referred to above are included in a class known as optical range-gated systems in which the receiver means is gated open for a relatively short distance around the object to be observed. The system of the present invention, on the other hand, does not utilize such narrow range gating, but rather provides direct viewing of the entire ambient scene with improved visibility.

A principal objective of the present invention is to provide practical visibility enhancement in diffusive media with direct viewing of a scene, the system being applicable to land, air and marine vehicles, where direct viewing is essential for safe and effective operation.

Another object of the invention is to provide a system for optimum viewing of the objects within a scene to the maximum range possible, while providing the realism of ambient lighting of the scene.

Yet another object of the invention is to provide a viewing panel in the system having electro-optic shutter means with large apertures, with operationally wide open and closed angles, and which utilizes practical operating voltages.

A still further object of the invention is to provide light flashing means within the system which are efficient and controllable so as to meet the requirements of the system.

A particular object of the invention is to provide a system having applicability to aircraft, and which includes means for improved distance viewing for the aircraft while on a final landing approach.

A further particular object of the invention is to provide means in the system for suppressing the brilliant light of headlights from on-coming vehicles.

One implementation of the system of the invention, utilizes a gaseous discharge flash lamp as its light source, the lamp being energized by short pulses at a high repetitive rate, giving the appearance of continuous illumination. The scene is directly viewed through a special panel or goggles. The panel (or goggles) operates as a high-speed optical shutter, or attenuator, which reduces its optical transmissibility by one thousand times or more for each light flash. Each of the periods of light attenuation of the scene by the panel is for the whole period of the flash plus a period after the flash cessation which is equivalent to the round-trip propagation time to a predetermined cut-off distance. For example, if the cut-off distance is 100 feet, the reflected light back through the panel would be attenuated through the period of the flash plus approximately 200 nanoseconds. Thus, the observer would see only those objects and backscatter beyond 100 feet, and the high intensity closer backscatter would be subdued, permitting viewing of the object to greater distances through fog and other diffusive media.

BRIEF DESCRIPTION OF THE DRAWINGS

FIG. 5 is a trigger pulse forming circuit for the fast opening of a liquid crystal electro-optic shutter;

FIG. 6 is an optical lens arrangement for the liquid crystal electro-optic shutter; and FIG. 7 is a more detailed schematic diagram of the system similar to the system of FIG. 1, partly in block form and partly in circuit detail.

DETAILED DESCRIPTION OF THE ILLUSTRATED EMBODIMENT

Figure 1:
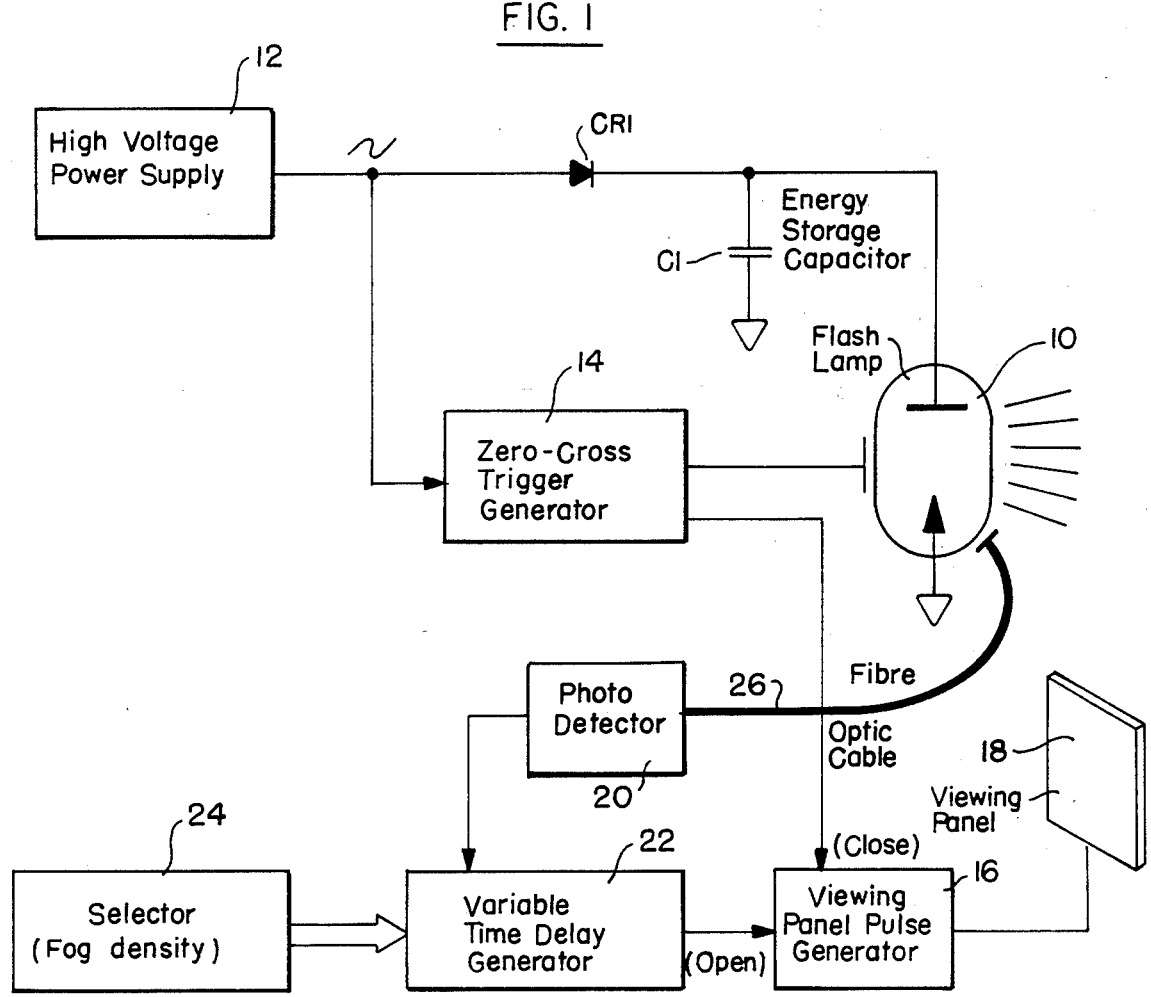
FIG. 1 is a block diagram of a system representing one embodiment of the invention.

One possible implementation of the system of the invention is shown in block form in FIG. 1. The system of FIG. 1 includes a flash lamp 10, and associated high voltage power supply 12, an energy storage capacitor C1, and a zero-crossing trigger generator 14. The high voltage power supply 12 provides high alternating current voltage, as might be obtained from an aircraft 400 Hz supply, or from an inverter at some suitable frequency. Capacitor C1 is charged to the alternating current peak of the power supply on the rising positive quarter cycle through a half-wave rectifier diode CR1. As the high voltage wave decreases from the positive peak, the zero-crossing trigger generator 14 senses the zero-voltage crossing and provides a high voltage trigger pulse to flash lamp 10. When triggered, the flash lamp conducts, discharging capacitor C1 and producing a short, intense flash, typically of about 1 microsecond in length.

Zero-crossing trigger generator 14 also provides a pulse output to a viewing panel pulse generator 16. Generator 16, in turn, provides a pulse for a viewing panel 18, closing an electro-optic shutter in the viewing panel at the initiation of the flash from lamp 10.

A photodetector 20 monitors the optical pulse of the flash lamp 10 by means of a fiber optic cable 26, and produces an equivalent electric pulse at its output. The fiber optic cable serves to isolate the photodetector 20 from the intense electric field of the flash lamp.

The output of photodetector 20 triggers a variable time delay generator 22 which provides a predetermined time delay, corresponding to a selected cut-off distance as set by a selector 24. The variable time delay generator 22 then outputs a pulse to the viewing panel pulse generator 16 which causes the pulse generator 16 to terminate its pulse to the viewing panel 18, causing the electro-optic shutter in the viewing panel to open. Reflected light from objects at the greatest distance of concern in the scene under observation will then be returned for view for the length of the round trip propagation period minus the cut-off distance delay.

Although the basic operation of the system of the invention has been described briefly above, it is appropriate at this time to discuss certain aspects of its operation. It is implied in the preceding description that, if the cut-off distance is zero, reflected light from the maximum operating range would arrive at the observation point just as the flash of lamp 10 terminates and as electro-optic shutter in viewing panel 18 opens. Therefore, the flash length is twice the propagation time to the maximum range, or 1 microsecond for a 500 foot range. For this case, reflected light would return from an object at 500 feet for the full 1 microsecond, but from an object at 250 feet only for 0.5 microseconds.

Therefore, the integrated light returned in the system of the invention is proportional to the object distance, reducing the effects of fog (or other diffusive agent in the medium) loss, inverse square spreading loss, and intense close-in backscattering. This effect further optimizes viewing to greater distances. For example, under no fog conditions with the viewing panel 18 optically opening at the end of the flash from lamp 10, the resulting appearance would be that objects at some distance are lighted brighter than normal as compared with those at shorter distances. That is, under these conditions the brightness of objects will be inversely proportional to distance, rather than inversely proportional to the square of the distance. This factor also improves viewing distance through a diffusive and lossy medium such as fog.

Backscattered light, as seen from the viewing point, is an integration of light from all distances, although that from the greater distances has much less contribution due to the normal inverse square spreading loss and any fog loss. However, it is still advantageous to limit the flash length and range to that required. Limiting the pulse length to that required eliminates potentially wasted flash energy, permitting increased flash intensity for a given average power or reducing the power input. The optimum flash length is twice the propagation time to the maximum distance minus twice the propagation time of the cut-off distance. However, in the practical case where short cut-off distances are typically needed, the flash length would normally be twice the propagation time to the maximum distance.

Figure 2:
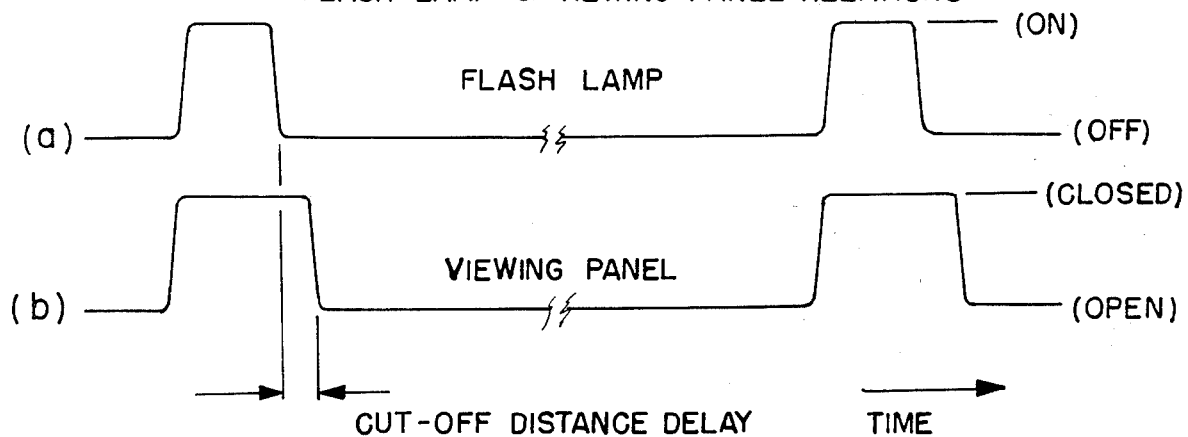
FIG. 2 is a series of idealized curves showing the relationship between the energization of the flash lamp in the system and activation of the viewing panel.

FIG. 2 shows relatively square light pulses in order to illustrate the principle of operation of the system of the invention. However, for short pulses of the order of 1 microsecond in length, it is impractical to obtain such a shape with available flash lamps. It should be noted, however, that the desired pulse characteristics are obtainable with lasers, but their factors of complexity, cost, low efficiency and low reliability, leave the preferred choice to gaseous discharge tubes. There are practical physical limitations to obtaining relatively square current pulses, but of most significance, however, is the afterglow resulting from the de-ionization time of the gas after current cessation. The exponential decline of the afterflow may be several times the length of the current pulse with conventional flash lamps. Special flash lamps, such as the annular ring, or coaxial, type have substantially reduced afterglow and are appropriate for use as the flash source. A bulb-type flash lamp may also be used for low-to-medium average power levels. However, the residual light decay time must be considered. One factor that must be considered is the fact that a large portion of the spectral energy in the afterglow of the flash lamp is in the infrared region and, accordingly, is not visible. If a relatively low level of afterglow still exists after the viewing panel has been rendered transparent, the effect is to fill in and partially light objects closer than the cut-off distance. This will cause some degradation of the maximum distance performance, but when properly controlled, an overall beneficial effect is obtainable. Another means of control will be described subsequently herein.

The viewing panel 18 includes a high-speed electrooptic shutter. The shutter is closed to the high level backscatter during an interval immediately following cessation of the light flash from lamp 10, but is opened to the lower level object-reflected light also returning after the cessation of the flash. Mechanical shuttering is impractical because of speed and size limitations. Electro-optic shutters are the only practical approach for this device. The panel should have a low visual attenuation factor in the open condition, and an attenuation factor of at least 500 times higher in the closed condition, preferably 15,000 times higher. The transition time of the viewing panel 18 from closed to open is important, and for a typical application, this time should be less than 0.1 microseconds, although transition times up to 0.3 microseconds may be usable with modfications of cut-off distances. The closing time of the viewing panel is not critical to tens of microseconds in that closing action can precede flash initiation, if desired.

Two approaches to the electro-optic shuttering of the system of the invention will be described. It should be noted that both approaches utilize a pair of polarizers with an intervening control unit, which responds to the application of a suitable control voltage to cause a change in polarization of light passing through it, typically to effect birefringence. The devices appropriate for use as viewing panel 18 will now be described.

The Kerr cell, with its fast shuttering capabilities, has been used in many applications for a number of years. This cell has attained switching speeds of less than a nanosecond, and extinction ratios in excess of 10,000. Thus, more than adequate performance insofar as the present system is concerned is attainable by the Kerr cell. The problem with respect to the Kerr cell is obtaining sufficiently large aperture sizes with practical control voltage levels. A typical cell with a one inch aperture requires approximately 40 KV for operation, which represents a safety hazard, as well as being difficult to implement. The heart of the Kerr cell is a transparent enclosure filled with a dielectric liquid, such as nitrobenzene. A pair of electrode plates are mounted parallel to, and spaced around the directional viewing axis of the cell. An electrostatic field is created between the plates to cause the birefringence needed for the optical shuttering, along with associated crossed polarizers at the front and rear surfaces of the cell. The orthogonal component of the birefringence which, in effect, opens the shutter, is proportional to the square of the electric field gradient, to the length of the electrodes along the viewing axis, and to the "Kerr constant" of the dielectric material.

Figure 3:
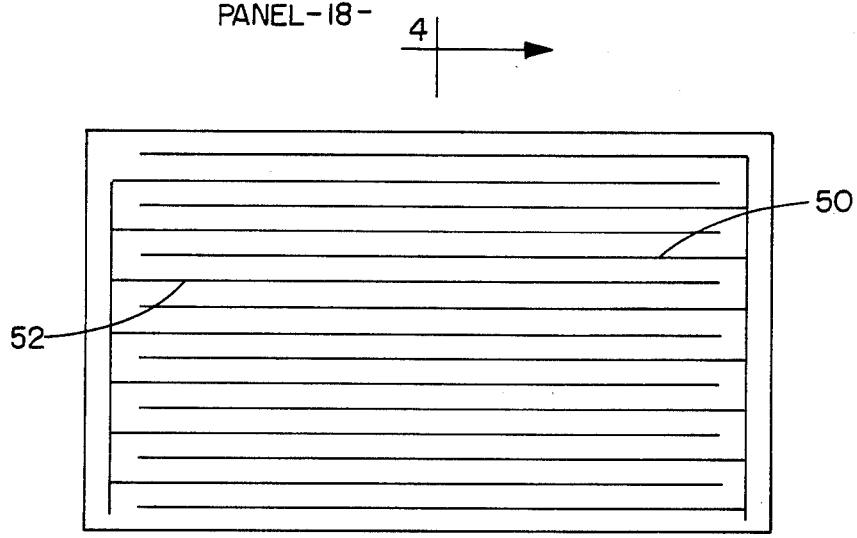
FIG. 3 is a front view of one type of viewing panel showing the electrode arrangement on the face thereof.
Figure 4:
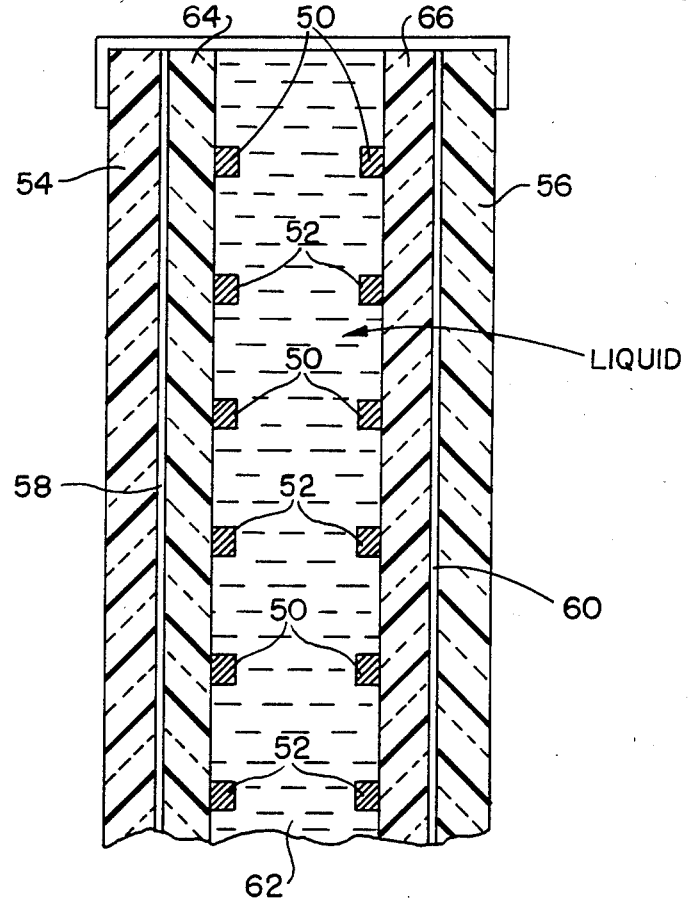
FIG. 4 is an end cross-sectional view of the viewing panel of FIG. 3.

A large area of viewing panel, for example 6"×12", is not practical for a conventional Kerr cell electrode arrangement, since extremely high and dangerous voltage would be required. A more practical construction of the cell insofar as the present system is concerned is shown in FIGS. 3 and 4. FIG. 3 shows the interleaved electrodes 50 and 52 covering the surface of the viewing panel. FIG. 4 shows a cross-section of the viewing panel with the front and rear sets of electrodes on the dielectric surfaces. The viewing panel, as shown in the cross-sectional view of FIG. 4, includes a pair of cover glass panels 54 and 56, and a pair of inner or electrtode glass panels 64 and 66. The panels 54 and 64 have an interposed polarizer 58, and the panels 56 and 66 have an interposed polarizer 60. The polarizers 58 and 60 are mounted with their polarization axes disposed 90° with respect to one another. As shown, the electrodes 50 and 52 are formed on the inner faces of panels 64 and 66. Finally, the cell contains a dielectric liquid designated 62.

The electrodes 50 and 52 may be vapor deposited or plated on the surface of the glass members 64 and 66. The corresponding front and rear electrodes 50 and 52 are electrically connected in parallel. The vertical spacing between the electrodes should not be appreciably smaller than the horizontal spacing between the corresponding electrodes in order that the electrical field gradient and resulting polarization shift will be relatively uniform throughout the dielectric. It should be noted that the structure illustrated in FIGS. 3 and 4 is not a single Kerr cell, but a series of Kerr cells, with adjacent cells having common voltage electrodes. Also, it should be noted that the common voltage electrodes on each side of the cells increase the effective length of the electrodes and decrease the required operating voltage. By such a construction, relatively large shutter areas may be obtained, and because of the relatively small structure of the multiple cells, significantly lower operating voltages can be used. A typical construction would have vertical spacing between the electrodes of about 0.01 inches, electrode width of about 0.002 inches, and a dielectric thickness of approximately 0.015 inches.

A second type of electro-optic shutter utilizes a liquid crystal cell. Liquid crystal cells have become increasingly popular in recent years for many types of digital, and even for television, displays. Liquid crystal cells have also been used as electro-optic shutters. However, there are serious limitations in the use of conventional liquid crystal cells in the system of the present invention. One limitation is speed of transition from open-to-close, and vice versa, since the transition speed of even the best of these devices is of the order of 1 millisecond.

Another limitation in the use of conventional liquid crystal cells is the fact that the viewing angle through a conventional cell is relatively narrow. Moreover, the open-to-close attenuation ratio is usually low, typically of the order of 30. Within the last several years a new "surface mode" liquid crystal cell has been developed in which the transition speed is increased by 1 to 2 orders of magnitude compared with previous techniques. While the transition speed of the surface mode liquid crystal is decreased to about 100 microseconds, it is still much too slow for use in the present system as viewing panel 18. However, use of a modified surface mode liquid crystal cell, in which the resistivity of the transparent surface electrode is reduced, along with the associated R-C time constant, permits a high voltage pulsing technique to be used to reduce the closed-to-open transition time to a small fraction of a microsecond, which renders the modified cell appropriate for use in the system of the invention. The closing transition time of the modified liquid crystal cell is essentially unchanged and relatively slow, but this time is not critical because the shutter closing can be initiated prior to the triggering of flash lamp 10.

FIG. 5 shows a simple high voltage pulsing circuit and a typical waveform which may be used to drive the modified liquid crystal cell. The pulsing circuit of FIG. 5 includes a series resistor R1 and a shunt resistor R2. A capacitor C1 is connected across resistor R1. A pulse, for example, of approximately 500 volts may be applied across the input terminals of the circuit, and the circuit responds to the input pulse to provide an output waveform, as shown, which includes a high voltage spike of a duration of the order of 150 nanoseconds. The high voltage spike is used to drive the liquid crystal cell, and its duration is approximately the length of the opening transition period, the spike then decaying to the normal operating voltage. Properly constructed cells will withstand the peak voltage on a steady-state basis, but the narrow voltage spike is sufficiently long only to permit alignment of the crystal molecular structure, and not for any cascading breakdown effect, even if the cell is moderately prone to such a breakdown effect on a steady-state basis.

A modified electro-optic liquid crystal cell is shown in FIG. 6. The combination of FIG. 6 includes a convex/planar lens 100 which is placed in front of the cell 102, and a planar/concave lens 104 which is mounted on the rear of the cell. With proper design, no appreciable optical distortion will result. However, the light entering and leaving the cell 102 is reduced in angle off the optical axis, thus increasing the usable viewing angle. It is obvious that this technique is applicable only if the cell is in the form of goggles worn by the observer, rather than a large area viewing panel. Known techniques of cascading two liquid crystal cells will provide the necessary increase in open-to-close attenuation ratio. The advantage of using the liquid crystal cell is that it can be operated at significant lower voltages than the Kerr cell.

The flash repetition rate is controlled primarily by the frequency of the high voltage power supply 12 in FIG. 1. There is some choice when a given frequency, as will be discussed subsequently, and a choice of inverter frequency when starting from a direct current primary power supply. The choice is dependent on a number of factors, including flash lamp characteristics and ambient light effects. Flash rate limits are bounded on the low end to about 200 per second, primarily to minimize stroboscopic effects. The upper limit can go to well over 100,000 per second where the flash length is approximately 50% of the total period. However, typical flash lamp limitations reduce this latter rate by over an order of magnitude. In order to maintain a desired average of visual light intensity, the flash lamp input pulse power must be inversely proportional to the flash rate. A practical flash rate is in the range of 500 to 1,000 per second.

The visibility enhancement system represented by the block diagram of FIG. 1 is shown in more detail in FIG. 7. Certain modifications have also been incorporated into the system of FIG. 7. The system of FIG. 7 includes a programmable microprocessor U9. The purpose of the microprocessor is to change the cut-off distance from flash-to-flash in such a manner as to optimize the viewing over the whole scene of interest. The system of FIG. 7 also includes a particular control for the flash lamp VT2 by which the pulse form, in particular, the trailing edge of each pulse, can be controlled, providing versatility and efficiency. The system of FIG. 7 also includes a capability for suppressing the strong light emanating, for example, from the headlights of an oncoming vehicle.

As shown in FIG. 7, the energy for firing flash lamp VT2 is stored in capacitors C1 and C2. These capacitors are effectively connected in series during firing, doubling the power supply voltage. The charge voltage of the two capacitors is above the self-firing voltage of the flash lamp VT2. Hold-off and firing of the flash lamp are accomplished by a triggerable spark gap VT1 in the illustrated embodiment.

The alternating current voltage from an appropriate power source is stepped up by a transformer T1. A high voltage secondary winding 1-3 of transformter T1 may have peak voltages of the order of 5,000 volts, depending on the requirements of the system. As terminal 1 rises above ground potential, capacitor C1 charges through rectifier diode CR1, and the capacitor C1 becomes fully charged when terminal 1 is at the peak of the voltage cycle. The charge remains on capacitor C1 as the voltage decreases at terminal 1. In the meantime, capacitor C2 is charged negatively from terminal 3 through rectifier diode CR4 and resistor R2. During the same quarter cycle, the voltage on terminal 4 of a low voltage secondary winding of transformer T1is also swinging in the positive direction, and charges capacitor C4 through rectifier diodes CR5 and CR8 to a value of typically 200-300 volts. This same voltage from diode CR5 feeds a resistive divider consisting of resistors R3 and R4, the junction of which is connected to one input of a comparator U1. A Zener diode CR9 is connected from that input of the comparator to ground to keep the peak voltage within the rating of the comparator.

During the next quarter cycle the voltage on transfomer terminals 1 and 4 decrease towards zero. Slightly prior to that point, the voltage at the junction of resistors R3 and R4, and the input to comparator U1 reaches zero, and the output of the comparator swings negative. The comparator output is introduced to the input of an amplifier U2, and causes the output of the amplifier to swing positive. The resulting positive output pulse, from the amplifier is applied through a capacitor C5 to the gate of a silicon controlled rectifier CR10, and it triggers the silicon controlled rectifier to its conductive state. This causes capacitor C4 rapidly to be discharged through the primary winding of a trigger transformer T2.

The resulting current spike through the primary of transformer T2 generates a high secondary voltage which is introduced through a capacitor C3 to the trigger electrode of a triggerable spark gap device VT1. This high triggering voltage initiates conduction of the triggerable spark gap device VT1, essentially connecting the positive side of charged capacitor C1 to the negative side of charged capacitor C2, resulting in the sum of the voltages across the two capacitors appearing across resistor R2 and flash lamp VT2. The flash lamp VT2 breaks down and flashes, thereby discharging capacitors C1 and C2 through the triggerable spark gap device VT1. At this time there is essentially zero voltage across terminals 1 and 3 of transformer T1, and therefore zero current to sustain conduction through spark gap device VT1 and flash lamp VT2, when capacitors C1 and C2 are discharged. Accordingly, the spark gap device VT1 and flash lamp VT2 return to their non-conductive states.

Now, the voltage starts to rise in the reverse direction across windings 1-3 and 4-6 of transformer T1. Capacitors C1 and C2 now charge through rectifiers CR2 and CR3 respectively. Capacitor C4 charges positive through rectifiers CR6 and CR8, and the voltage at the junction of resistors R3 and R4 swings positive. Following the voltage peak, to which the three capacitors C1, C2 and C4 are charged, the voltage decreases to zero, at which point comparator U1 again produces a negative voltage swing which, in the sequence described above, triggers spark gap device VT1 and causes flash lamp VT2 again to flash.

Therefore, the system of FIG. 7 produces two flashes of the flash lamp VT2 for each power supply cycle. The flash lamp triggers at the zero voltage crossing and, therefore, does not require the usual more complex high voltage D.C. power supply with a Lossy series charging resistor. Such a series charging arrangement is generally critical, a compromise between the maximum flash repetition rate and reliable current cut-off in the flash lamp. The present invention provides a flash lamp power supply which is simple, efficient, non-critical and permits operation to the intrinsic maximum flash rate of the flash lamp.

It should be noted that the triggerable spark gap VT1 may be replaced with a thyratron, such as a ceramic hydrogenfilled thyratron of the type commonly used in radar and laser applications. In fact, the thyratron is preferred for medium to high flash rates.

Because of the series inductance of spark gap device VT1, flash lamp VT2, capacitors C1 and C2, and associated interconnecting leads, the typical current pulse form is more ideal than just that of a normal exponential R/C discharge. However, capacitors C1 and C2 may be replaced with multielement pulse-forming networks, if so desired, to produce a squarer current pulse.

The system of FIG. 7 includes a cut-off panel Z1 interposed between the flash lamp VT2 and the scene to be illuminated. The system also includes a viewing panel Z2. The panels Z1 and Z2 may each include an electro-optic shutter similiar to viewing panel 18 of FIGS. 1, 3 and 4, as described above. The purpose of the separate panel Z1 is to provide a sharper cut-off on the trailing edge of each light flash, thereby negating the adverse effects of afterglow.

While there are other obvious methods for controlling the cut-off panel Z1, the illustrated system is relatively simple and straightforward. Photodetector diode CR11 monitors the flash intensity by way of fiber cable 26, producing a positive voltage output proportional to the intensity of each flash. An infrared filter 27 is interposed between the flash lamp and the fiber optic cable so that the photodetector CR11 meters the visual output only, and not the relatively high intensity infrared output in the afterglow.

The resulting voltage pulse from photodetector CR11 drives a Schmitt trigger U3 which, in turn, drives a high voltage amplifier/switch U4. The output pulse from U4 drives the panel Z1, and, depending on the panel type, may range from 300 to 5,000 volts. High voltage field effect transistors, krytron switching tubes, or high voltage vacuum tubes, have capabilities over this range. The high voltage pulse to cutoff panel Z1 opens the electro-optic shutter for passage of each light flash from flash lamp VT2. Opening and closing of the shutter occurs at 30%–50% of the flash peak. The flash rise is fast, so that very little energy is lost. The trailing edge of the flash is relatively slow, but it is cut off with the closing of panel Z1. Thus, the use of flash cutoff panel Z1 provides a means for sharpening the trailing edge of the pulse form of each light flash produced by the system.

Triggering of the silicon controlled rectifier CR10, which initiates the flash sequence as described above, also provides an output to set a flip-flop U11. The set output of flip-flop U11 drives a high voltage amplifier/switch U5 to a low output, closing the shutter of viewing panel Z2 to view. The trailing edge of the output pulse of Schmitt trigger U3 also triggers a variable time delay counter U10 to begin a cut-off distance delay count. Clock pulses from clock generator U12 provide precise timing for the delay count. The selected count is set into counter U10 by a programmable microprocessor U9. At the end of the selected count, the output of counter U10 resets flip-flop U11, causing the output of amplifier/switch U5 to go high, opening the viewing panel Z2. The programmable microprocessor includes a clock generator U8, and a usual read-only memory U7. The desired cut-off distance delay counts for the variable time delay counter U10 are determined by microprocessor U9, based on the manual setting of a fog-density selector S1.

The flash lamp VT2 is controlled so that the duration of each flash is twice the propagation time to the predetermined maximum range of the system. The optical shutter of viewing panel Z2 closes at the beginning of each flash. When a cut-off distance delay count is set into counter U10, the optical shutter of viewing panel Z2 does not open until the reflected light from each flash has returned to the viewing point from any object between the cut-off distance and the maximum range. Nothing will be seen lighted at closed distances, except for any possible ambient scene lighting.

In most applications it is undesirable, and may be unsafe, to have unlighted viewing at certain distances. With the system of the invention, it is possible to control the opening time of viewing panel Z2 in such a manner as to provide a gradual fill-in of light prior to the actual cut-off distance. However, even with such a control, the desired results are not obtainable over a range of cut-off distances, where the settings of the cut-off distances are fixed. However, by varying the cut-off distance from flash-to-flash in a proscribed manner, the desired illumination of objects throughout the scene may be obtained. The purpose of the programmable microprocessor U9 is to set into counter U10 the proscribed sequence of cut-off distance codes for a given density of the diffusive medium, as set by selector S1. The read-only memory (ROM) U7 provides the necessary coding to microprocessor U9, and the triggering output from silicon controlled rectifier CR10 provides for actuation at each flash of flash lamp VT2. It should be noted that with a typical sequence for optimum viewing the majority of flashes will have longer cut-off distances set, with relatively fewer at the shorter distances. Also, with flash rates of the order of 500 per second, or higher, the cut-off distance changes are so rapid as to be unnoticeable.

FIG. 7 also includes circuitry for suppressing strong light emanating, for example, from the headlights of approaching vehicles. Photodetector CR12, with a suitable optic lens 110, senses the light from oncoming vehicle headlights. The resulting voltage is amplified in an amplifier U6, and its output drives high voltage amplifier/switch U5. The output of amplifier U5 closes, or partially closes, viewing panel Z2.

When the oncoming vehicle is equipped with a similar system to the one described above, so that the light emanating from the approaching vehicle is in the form of a high intensity short flash, the resulting voltage pulse is passed directly to amplifier U6 through capacitor C6, and the output of amplifier U6 is adequate to produce complete closure of panel Z2 for the duration of the flash. If strong continuous light is sensed, the resulting voltage will be fed to amplifier U6 through resistor R10. The value of resistor R10 and the gain of amplifier U6 are such that only a moderate attenuation by panel Z2 is produced. The whole scene's illumination is dimmed to a degree during this period, but blinding of the vehicle's operator is prevented.

A degree of sophistication in the circuitry, not shown in FIG. 7, may provide the full "open" voltage to panel Z2 for the period of the reflected light return from each flash of this system. Thus, undiminished illumination from this system can be provided, while dimming strong continuous light from the other vehicle.

When applied to aircraft landing, the invention's cut-off distance may be programmed somewhat differently. Precise Distance Measuring Equipment (DME) is being increasingly used in conjunction with ILS (Instrument Landing System) or other landing guidance equipment. Precise measured distances to the runway threshold are obtainable and can be usd to set the cut-off distance. As the aircraft approaches the runway threshold, the cut-off distance would be accordingly decreased, maintaining the runway threshold just beyond the cut-off distance so that it will be lighted and seen from the maximum possible distance on into the runway. At some predetermined distance, the cut-off distance would be programmed to provide some light at shorter distances, as well, for the flare, touch-down and roll-out. Normal aircraft panel instruments, but preferably a heads up display with aircraft attitude and other flight parameters can be viewed through the panel as well as the outside lighted scene.

The invention provides, therefore, a system for viewing distant objects through a diffusive medium, such as rain, fog, snow, blowing dust or sand, by overcoming the effects of light backscatter. The system uses high speed optical shutters to block reflected light from nearby particles of the diffusive medium and to pass the reflected light from the distance objects to be viewed.

It will be appreciated that while particular embodiments of the invention have been shown and described, modifications may be made, and it is intended in the following claims to cover all modifications which come within the true spirit and scope of the invention.

What is claimed is:

1. A system for direct viewing an object through a diffusive medium located between the system and the object, said system including: an electric flash lamp for projecting successive flashes of light through the medium to the object to be reflected by the object; viewing means adapted to be interposed between the eyes of the viewer and the object and through which the object is directly observed by the viewer; said viewing means including an electro-optic shutter to permit the object to be viewed through the viewing means only when the shutter is open; first electric generator means connected to the flash lamp for introducing trigger pulses to the flash lamp to cause the flash lamp to project successive flashes of light each having a time duration of twice the light propagation time to a predetermined maximum range of the system; and second electric generator means coupled to said first generator means to introduce gate pulses to said optical shutter to cause the shutter to close before the initiation of each flash of said successive flashes of light and to open a predetermined time after the cessation of each flash of said successive flashes of light corresponding to twice the light propagation time to a selected cut-off distance of the system.

2. The system defined in claim 1, in which said viewing means comprises a liquid crystal cell.

3. The system defined in claim 2, in which said liquid crystal cell includes a convex-planar lens mounted on the front side thereof and a concave-planar lens mounted on the rear side thereof to broaden the viewing angle of the panel.

4. The system defined in claim 1, in which said viewing means comprises a Kerr cell.

5. The system defined in claim 4, in which said Kerr cell includes a pair of spaced transparent panels and a pair of interleaved electrodes formed on the facing surfaces of said panels.

6. The system defined in claim 1, and which includes cut-off distance adjustment circuit means connected to said second electric generator means to cause said shutter to open a predetermined time interval after the cessation of each flash of said successive light flashes to provide predetermined cut-off distances for the viewing means as selected by said cut-off distance adjustment circuit means.

7. The system defined in claim 6, and which includes programmed sequential adjustment circuit means connected to said cut-off distance adjustment means to provide programmed cut-off distance changes for the viewing means to optimize viewing through the viewing means over a predetermined range.

8. A system for direct viewing of a scene through a diffusive medium, said system including: a flash lamp for projecting successive flashes of light through the medium to illuminate the scene and to be reflected by objects in the scene; a viewing panel adapted to be interposed between the eyes of a viewer and the scene and through which the objects in the scene are directly viewed by the viewer; an optical shutter included in said viewing panel to permit the scene to be viewed through the viewing panel only when the shutter is open; first electric generator means connected to the flash lamp for introducing high voltage trigger pulses to said flash lamp to cause the flash lamp to project successive light flashes each having a time duration of twice the light propagation time to a predetermined maximum range; second electric generator means connected to said first generator means to generate a gate pulse to close the shutter as each high voltage trigger pulse is introduced to the flash lamp; and further circuit means connected to said second generator means to terminate each gate pulse generated thereby and to open said shutter a predetermined time after the cessation of each light flash by said flash lamp corresponding to twice the light propagation time to a selected cutoff distance of the system.

9. The system defined in claim 8, and which includes photodetector means optically coupled to said flash lamp for producing an electric output pulse in response to each light flash projected by the flash lamp and for introducing the electric output pulses to the further circuit means for controlling the operation of the further circuit means.

10. The system defined in claim 8, in which said further circuit means includes a variable time delay generator.

11. The system defined in claim 10, and which includes selector means connected to said variable time delay generator for establishing a predetermined cut-off distance for the system.

12. The system defined in claim 11, and which includes programmable microprocessor circuit means connected to said variable time delay generator to change the predetermined cut-off distance of the system from flash-to-flash of said flash lamp in a proscribed manner to optimize viewing through said viewing panel over an entire scene of interest.

13. The system defined in claim 8, and which includes photodetector means for sensing incoming light from an independent source, and circuitry connected to said photodetector means and responsive to the output thereof for causing said optical shutter to close in the presence of such incoming light.

14. The system defined in claim 1, in which said first electric generator means is adapted to be connected to an alternating current power supply, and circuitry included in said power generator means for producing two flashes of said flash lamp for each cycle of alternating current power from said power supply.

15. The system defined in claim 8, and which includes a flash cut-off panel interposed between the flash lamp means and the scene to cut off the trailing edge of each light flash from said flash lamp.

16. The system defined in claim 1, in which said first electric generator means is adapted to be connected to an alternating current power supply, and circuitry included in said first electric generator means for producing said trigger pulses at the zero cross-over points of the alternating current voltage from the power supply.

17. The system defined in claim 1, and which includes means responsive to distance measuring equipment data to adjust the cut-off distance of the system for optimum viewing during aircraft approach and landing.

* * * * *